March 1, 1966 — W. S. McGEENEY ETAL — 3,237,784
WORKPIECE HANDLING AND FEEDING APPARATUS
Filed Dec. 2, 1963 — 3 Sheets-Sheet 1
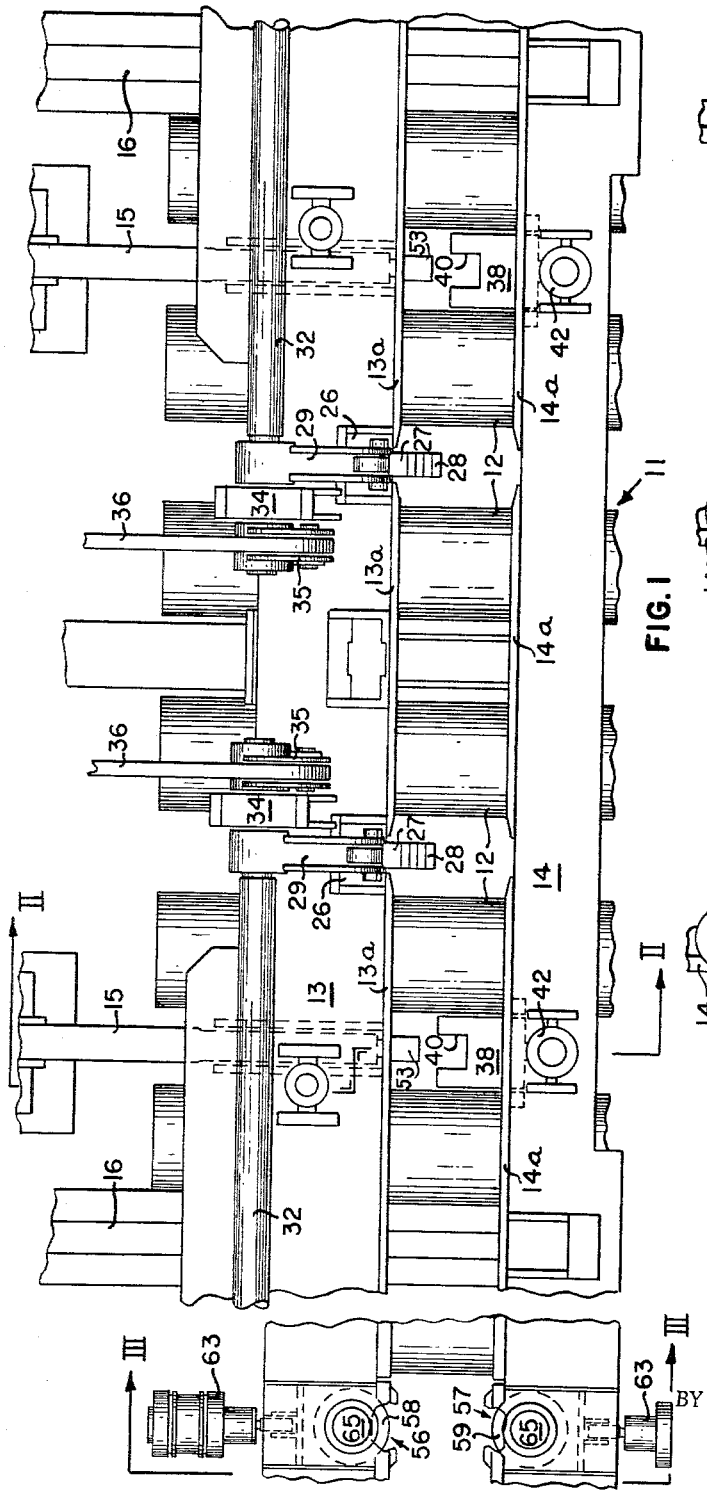
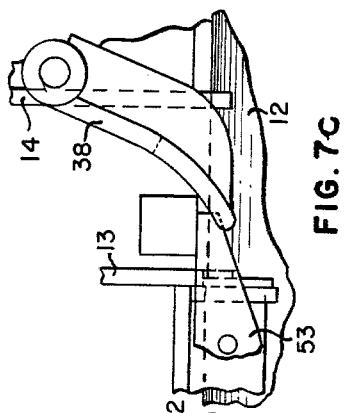
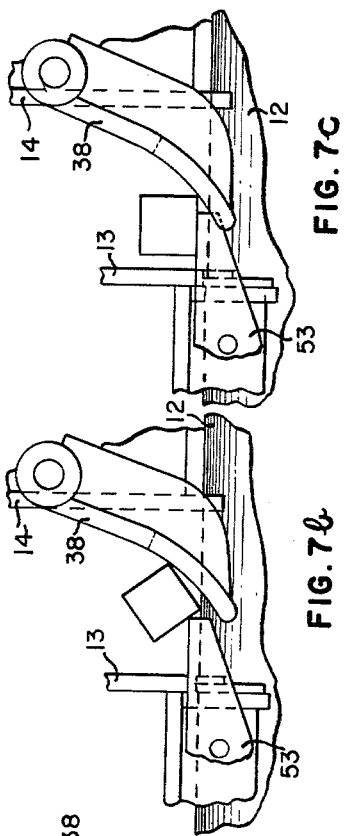
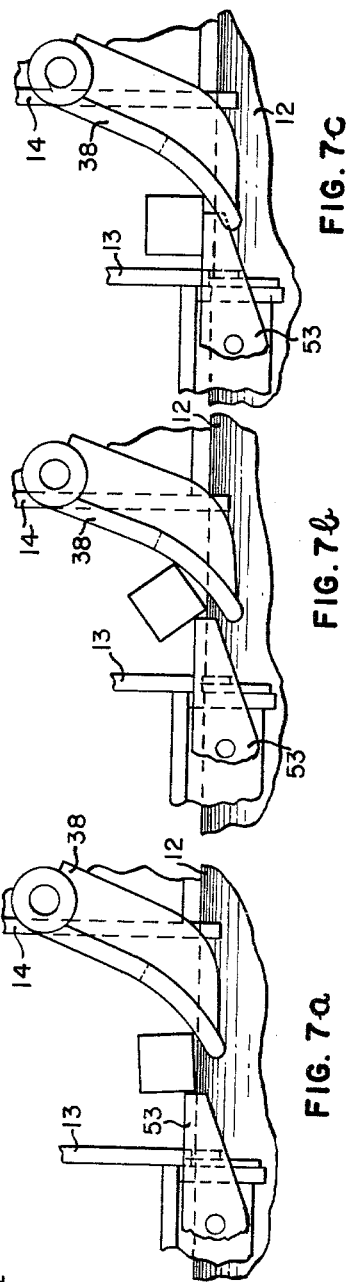
*INVENTORS*
WILLIAM S. McGEENEY
ROBERT R. FICKLEY
THEIR ATTORNEY March 1, 1966 W. S. McGEENEY ETAL 3,237,784
WORKPIECE HANDLING AND FEEDING APPARATUS
Filed Dec. 2, 1963 3 Sheets-Sheet 2

INVENTORS
WILLIAM S. McGEENEY
ROBERT R. FICKLEY
BY
Henry C. Westin
THEIR ATTORNEY

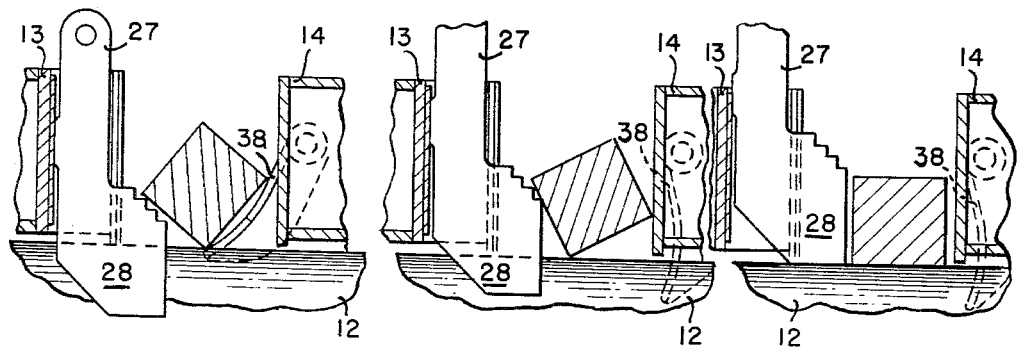
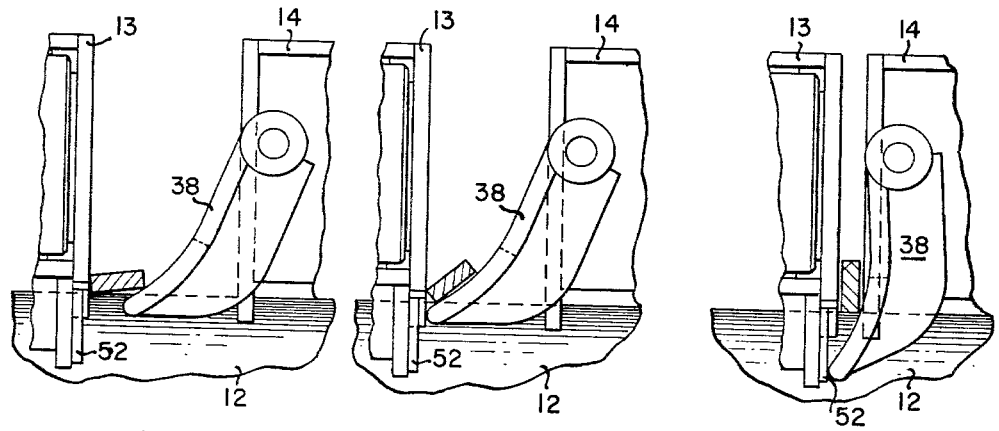
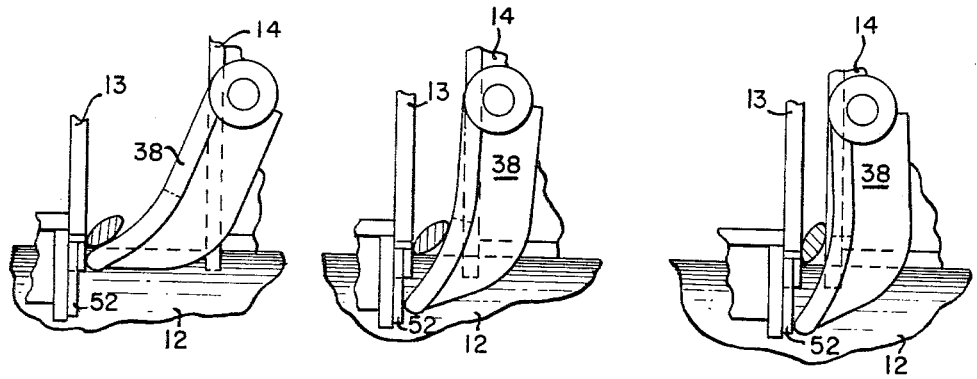
INVENTORS
WILLIAM S. McGEENEY
ROBERT R. FICKLEY
THEIR ATTORNEY United States Patent Office 3,237,784
Patented Mar. 1, 1966

3,237,784
WORKPIECE HANDLING AND FEEDING
APPARATUS
William S. McGeeney and Robert R. Fickley, Pittsburgh,
Pa., assignors to United Engineering and Foundry Company, Pittsburgh, Pa., a corporation of Pennsylvania
Filed Dec. 2, 1963, Ser. No. 327,365
7 Claims. (Cl. 214—1)

This invention relates to an apparatus for handling and feeding workpieces, for example, an apparatus for turning, positioning and feeding hot metallic workpieces such as blooms, bars and rods during a rolling operation.

It is believed that the present invention may be more quickly understood by referring to a very commonly employed prior device for handling bars as an incident to their being rolled by a reversing rolling mill. During the various reduction passes that are taken to reduce the bar to its final size and shape, it is a universal practice both to position the bar transversely of the rolls of the mill in front of the proper roll pass which will cause the next reduction to be taken, and to rotate the bars about their longitudinal axis either to change the surface that will be actually engaged by the rolls or to present the bar in a dispostion that agrees with the configuration of the pass opening.

In this regard there is usually associated entry and delivery tables with the rolling mill, which include a plurality of reversibly driven rollers that alternately feed and remove a bar from the mill. Cooperating with each table are pairs of opposed, transversely adjustable side guards, which with respect to the feeding of a bar to the mill pass over the upper surface of the table rollers to transversely position and then guide the bar in its longitudinal movement to the mill.

It will be noted also that in the cases where the mill also rolls products larger than bars, such as, billets and blooms, the side guards are employed in combination with a lifting finger, independently movably mounted on one of the guards that is employed to rotate the large-size workpieces about their longitudinal axes. The lifting fingers are commonly referred to as manipulator fingers.

While, as previously mentioned, the side guards and lifting finger can be used to turn the very large size workpieces, the use of such elements to turn workpieces of smaller size, such as bars and other workpieces of irregular shapes, has proven almost impossible. Consequently, it has been the practice to employ in conjunction with the fingers and the side guards, but separate and apart therefrom, a discrete bar turning device for each side guard. It will be appreciated now that we are addressing ourselves to mills that roll a relatively wide range of sizes and shapes of products.

One form of these bar turners include a pair of opposed critically shaped rollers between which the bar passes to be forcibly engaged thereby. The turning elements being contained within a suitable housing are then rotated to effect a rotation of the bar.

The aforementioned manipulator and bar turner are subject to a number of acute disadvantages inherent in such devices. With respect to the manipulator, one of these disadvantages has to do with the fact that a great amount of skill is required by an operator to properly position the side guards to effect the turning by a manipulator. Proper side guard positioning is very difficult to obtain since the side guards themselves obscure the operator's vision. Moreover, this disadvantage becomes increasingly acute as the bar becomes smaller in cross section as a result of the rolling.

As to the bar turner, the two critically shaped turning rollers can only accommodate a small range of bar sizes and cannot accommodate different-shaped workpieces, such as ovals and flats. This necessitates frequent changes of the turning rollers when different-sized bars and different-shaped workpieces are to be rolled. Moreover, frequent maintenance and repair of the bar turner is required as a result of the fact they employ a number of moving parts, all of which are subject to high temperature, large forces, not to mention the exposure to constant scale and water. Still another disadvantage inherent with such bar turners resides in the fact that to assure successful operation the bar must be forcefully clamped between the turning rollers. This decreases the driving force that the table rollers exert on the bar and cause difficulty and delay in conveying the bar in the rolling mill.

It is a principal object of the present invention to overcome each and every one of the aforementioned disadvantages by providing a workpiece handling device that not only will position and feed workpieces of different characteristics, but one that will turn such workpieces automatically in a manner that will require little or no particular skill on the part of an operator.

Another object of the present invention is to provide a turning device which, after turning has been complete, will in most cases be completely free of the workpieces, thus reducing any difficulty in feeding the workpiece into a rolling mill.

Still a further object of the present invention is to provide a means for turning, engaging and feeding a workpiece into a rolling mill of relatively small cross sections, and particularly those workpieces which have a small area of contact with the rollers of the table.

Another object of the invention is to provide cooperating pinch roll assemblies carried by each side guard to facilitate the transfer of certain workpieces.

According to one form of the present invention, there is provided an apparatus for turning, positioning and guiding workpieces, such as blooms, billets, bars and the like, incident to their being reduced or formed, a supporting means for the workpieces, first and second opposed side guards movable transversely relative to said supporting means, each having a workpiece engaging surface, a member carried by said second side guard being so constructed and arranged relative thereto that when in a first position it is preceded by said workpiece engaging surface of said second side guard, and in a second position it precedes said workpiece engaging surface of said second side guard, means for positioning said member in at least said second position, whereby on movement of said second side guard toward a workpiece said member is caused to engage the workpiece and cooperate with said first side guard to turn the workpiece about its longitudinal axis, and means for moving said side guards relative to each other to effect said turning of the workpiece and, thereafter, to cause said workpiece engaging surfaces of said side guards to position the turned workpiece in a desired plane and thereafter to guide it during movement in the desired plane.

The foregoing features, as well as others, will become more apparent from the following description of the embodiments of the present invention shown on the accompanying drawings of which:

FIGURE 1 is a partial plan view of a rolling mill-side guard table arrangement in connection with which one form of the present invention has been incorporated, the mill thereof not being illustrated;

Figure 2:
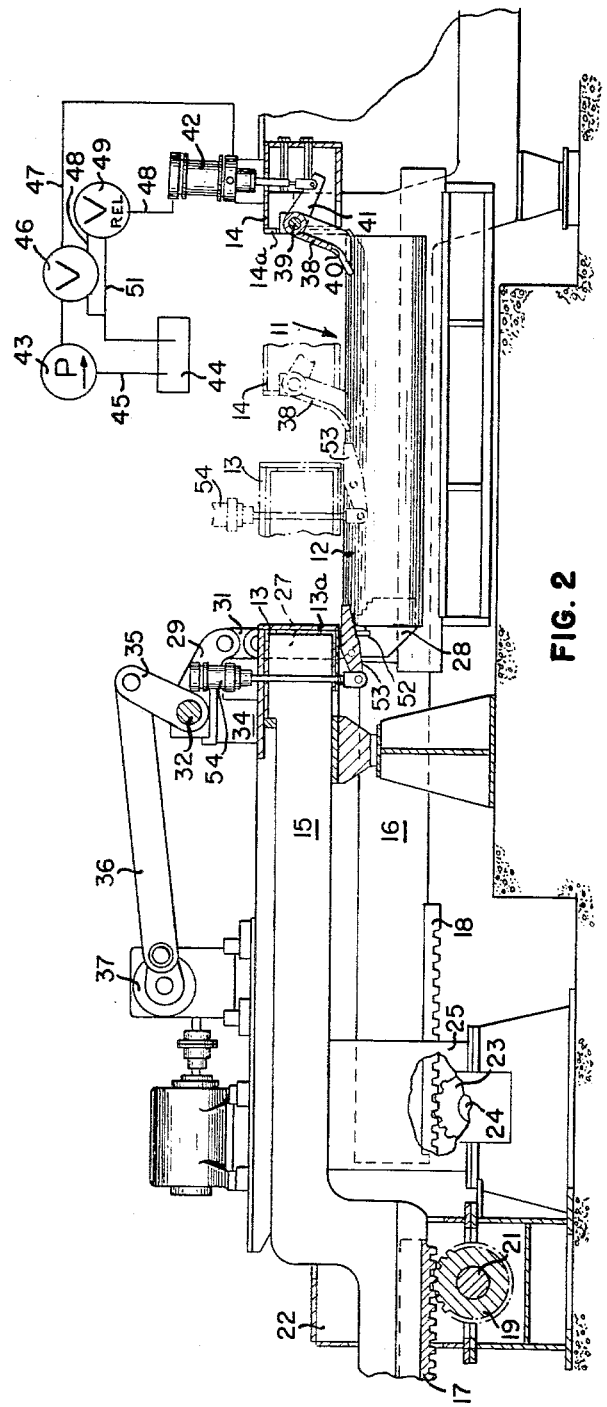
FIGURE 2 is a sectional view taken along lines II—II of FIGURE 1, except that on the former a fluid circuit is shown that is not illustrated in FIGURE 1.

FGURES 4a, 4b and 4c are enlarged sequence views of certain elements shown in FIGURE 2 illustrating the turning of a "billet";

FIGURES 5a, 5b and 5c are enlarged sequence views of certain elements shown in FIGURE 2 illustrating the turning of a "flat";

FIGURES 6a, 6b and 6c are enlarged sequence views of elements shown in FIGURE 2 illustrating the turning of an "oval";

FIGURES 7a, 7b and 7c are enlarged sequence views of certain elements shown in FIGURE 2 illustrating the turning of a "bar."

With reference to FIGURES 1 and 2 there is illustrated a roller table 11 employed to alternately feed and receive workpieces which are being reduced and/or formed by a rolling mill, not shown. The table 11, which is constructed in a manner well known in the art, includes a plurality of rollers 12 which, while not shown, are rotatably supported at their ends by bearing blocks and driven by suitable drive means. Arranged above and movable parallel to the axes of the rollers 12 are opposed elongated side guard heads 13 and 14, each having workpiece engaging wear plates 13a and 14a, respectively. To the heads 13 and 14 there are rigidly secured pairs of rams 15 and 16, respectively, which are arranged in a spaced-apart, side-by-side relationship and extend to the left-hand side of the roller table 11, as one views FIGURE 2. It will be noted from FIGURE 1 that the rams 16 pass between the rollers 12.

In still referring to FIGURE 2, secured to the bottom surfaces of the pair of rams 15 and 16 at their extended ends are rack gears 17 and 18. Meshing with each of the gears 17 are gears 19 (only one of which is shown), which are interconnected by a shaft 21 of a drive 22. Similarly, the rack gears 18 of the pair of rams 16 mesh with gears 23 (only one of which is shown), which are interconnected by a shaft 24 of a drive 25. It is to be appreciated that upon operation of either or both of the drives 22 and 25, the respective pairs of rams 15 and 16 will be moved, causing the side guard heads 13 and 14 to move relative to the table 11. In this manner a bar located on the table is positioned by the side guards relative to a particular roll pass in the mill.

As best shown in FIGURES 1 and 2 formed in the side guard head 13 are a plurality of longitudinally spaced-apart recesses 26. Positioned within each of these recesses are manipulator fingers 27 which have enlarged ends 28 having steps formed thereon that extend outward of the recesses and when in the inoperative position, as FIGURE 1 illustrates, are positioned below the top surfaces of the rollers 12. The upper ends of the manipulator fingers are each pivotally connected to an actuating arm 29 by a link 31. The actuating arms 29 are, in turn, secured to one of two horizontally arranged torque shafts 32 which are rotatably mounted on the top surface of the side guard head 13 by bearing blocks 34. Affixed to the adjacent ends of the torque shafts 32 are arms 35 that are connected to links 36 which, in turn, are connected to a common drive 37, the drive being carried by the rams 15. It is to be appreciated that upon operation of the drive 37 the shafts 32 are rotated causing the manipulator fingers 27 to move vertically within the recesses 26.

FIGURES 1 and 2 also show that contained within the side guard head 14 are spaced-apart retractable turning arms 38 that are pivotally mounted at their upper ends to pins 39 in the upper internal area of the side guard head 14. Each of these arms is constructed with a wide workpiece engaging face that is slightly concave in shape at its lower portion and the lower end has a centrally located notched recess 40. Attached to each arm 38 at its pivotal mounted end and extending inward of the side guard head 14 is an arm 41 which is engaged at its outer end by the rod end of a piston cylinder assembly 42. Operation of the piston cylinder assemblies 42 cause the turning arms 38 to be rotated about their pivotal connections and to extend angularly outward of the side guard head 14.

In the preferred embodiment the operation of the piston cylinder assemblies 42 is controlled by fluid control circuit, such as illustrated schematically at the upper right-hand portion of FIGURE 2. In this circuit a pump 43 is connected to a tank 44 by a line 45. A delivery line from the pump conducts fluid to a control valve 46 which directs the fluid to either of two lines 47 and 48. The lines 47 and 48 are connected, respectively, to the rod and cylinder ends of the piston cylinder assemblies 42. Placed in the line 48 is a relief valve 49, to which is connected a drain line 51 that communicates with a tank 44. The relief valve 49 functions to limit the magnitude of the pressure in the line 48. As will be more fully appreciated hereinafter, the extended arms 38 are forcibly retracted within the side guard head 14 by their engagement with the side guard 13. This retraction causes the pistons of the piston cylinder assemblies 42 to also be retracted, thus increasing the pressure in the line 48. This increased pressure is then relieved when greater predetermined pressure setting of the relief valve 49, which will allow the discharged fluid from the cylinders to pass into the tank 44.

As best shown in FIGURE 2, on the bottom surface of the side guard head 13 there is provided a downward extending stop plate 52 located diametrically opposite the turning arms 38, so that as the side guards are brought together, the lower ends of the turning arms 38 engage the stop plate 52 causing the aforesaid retraction of the pistons of the cylinder assemblies 42.

Centrally and perpendicularly mounted behind the stop plate 52 to the side guard head 13 are two spaced-apart horizontal extending striker arms 53, each having one end thereof extending outward from the side guard head 13 through a slot in the stop plate 52. As FIGURE 2 shown in outline form, when the striker arms are in their inoperative positions, the outward extending ends thereof are below the top surfaces of the rollers 12, and when in the operative position the outer ends of the arms protrude above the top surfaces of the rollers 12 which position is shown in full line in FIGURE 2. The operative and inoperative positions of the striker arms are obtained by individual piston cylinder assemblies 54, pivotally connected to the inner ends thereof.

Figure 3:
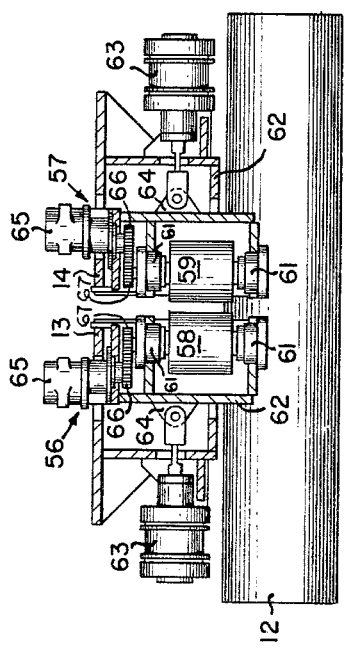
FIGURE 3 is a sectional view taken along lines III—III of FIGURE 1.

As heretofore indicated, it frequently occurs, particularly with respect to ovals and rectangular flats, that they have a small area of contact with the table rollers after they are turned. As a result, it is difficult to convey these workpieces to the mill by the roller table. To overcome such difficulty, as best shown in FIGURES 1 and 3, the present invention contemplates the use of a pair of cooperating pinch roll assemblies 56 and 57. The pinch roll assemblies comprise vertically disposed pinch rolls 58 and 59 which have bearings provided at each end thereof received in bearing blocks 61. The bearing blocks are, in turn, secured to and carried by carriages 62 that are slidably received in the end portions of the side guard heads 13 and 14 and horizontally adjustable relative thereto. The carriages are moved horizontally by employing piston cylinder assemblies 63 carried by the side guard heads 13 and 14 and operatively connected to lugs 64 formed on the carriages 62. The pinch rolls are each rotated by an individual drive arrangement including a suitable motor 65 vertically arranged and secured to the carriages 62. Secured to the motor shafts are spur gears 66 which mesh with spur gears 67 mounted on the ends of the respective pinch rolls 58 and 59. In a given case only one of the pinch rolls may be required to be driven.

In order that the application of the herein-disclosed turning device to a full range of different sized and shaped workpieces may be more fully appreciated the following brief description of the sequence drawings, FIGURES 4 through 7, will now be given.

With reference first to FIGURES 4a, 4b and 4c, there is illustrated the turning sequence of a relatively large-size billet such as may be processed in a rolling mill that also rolls many other types of products. As shown in FIGURE 4a prior to turning a billet, the side guard heads 13 and 14 are positioned approximately within the vicinity of the adjacent sides of the billet, before or after which the turning arms 38 are extended outward from the side guard head 14 by the unisonal operation of the piston cylinder assemblies 42. Thereafter, the manipulator fingers 27 are raised to cause their stepped ends 28 to engage and raise one edge of the billet until the opposite side engages the arms 38. As raising of the fingers 27 continues, as shown in FIGURE 4b, the arms 38 are retracted within the side guard head 14 by reverse operation of the piston cylinder assemblies 42. This retraction allows the billet to be further rotated to a position as shown; in FIGURE 4c, 90° from its original position.

The employment of the turning arms 38 not only facilitates the expedient turning of a large billet in a manner that does not require great precision in the positioning of the heads 13 and 14, but moreover, it permits the side guard heads to be positioned further apart than heretofore possible; thus, affording greater visibility to an operator during the turning operation, which has been found necessary if the operator is going to be able to quickly and efficiently operate the fingers 27.

FIGURES 5a, 5b and 5c and 6a, 6b and 6c illustrate the turning sequences for rectangular flats and ovals, respectively, which, according to the present invention may be simply and automatically turned. With reference to FIGURES 5a and 6a to carry out the turning of either shape or workpieces, the turning arms 38 are extended outward of the side guard head 14 by the operation of the piston cylinder assemblies 42. It may be well to point out that prior to this, the relief valve 49 will be adjusted to control the pressure in the line 48. The side guard heads 13 and 14 are then caused to move toward each other to engage the workpieces at one side by the side guard head 13 and at the lower corner of the other side by the turning arms 38. As movement of the side guards continue, the workpieces are forced upwardly onto the concave workpiece engaging face of the turning arms until the lower end of the arms engage the stop plate 52 causing the arms 38 to be forcibly retracted into the side guard head 13 since the pressure in the line 48 will be overcome, i.e. as this retraction occurs, the pressure in the piston cylinder assemblies 42 and in the line 48 is increased. The increased pressure is then automatically relieved by the functioning of the relief valve 49. As shown in FIGURES 5b and 6b, the side guards continue to move together causing retracting of the arms 38 until, as shown in FIGURES 5c and 6c, the flat or oval is rotated axially 90° from the original positions they were in. FIGURE 6c also illustrates that once in the upright position, the oval is maintained loosely in this position solely by the heads 13 and 14. From the foregoing, it is to be appreciated that after the proper setting of the relief valve 49 a workpiece may be automatically turned by simply bringing the side guards together.

With reference again to the oval and flat shaped workpieces, it will be noted that in their turned-up positions as shown in FIGURES 5c and 6c, only a small area of contact exists between the workpieces and the roller 12. In this position, as previously noted, it is difficult to convey the workpieces to the mill. To alleviate this condition, the pinch rolls 56 and 57 are brought in play. After the workpieces have been turned and located in their upright positions, the piston cylinder assemblies 63 are operated to cause the driven pinch rolls 58 and 59 to engage the opposite sides of the workpieces and thereby convey them longitudinally over the table 11 into the mill.

FIGURES 7a, 7b and 7c illustrate the turning sequence for a bar. Preparatory to turning the bar, the piston cylinder assemblies 42 are operated to cause the turning arms 38 to extend outwardly from the side guard head 14 and also the piston cylinder assemblies 54 are operated to raise the outward end of the striker arms 53 above the rollers 12 of the table 11, as shown in FIGURE 7a. The turning is then effected by moving the side guard heads 13 and 14 toward each other whereby the square bar is engaged at one lower corner by the striker arms 53 and at its other lower corner by the turning arms 38. The bar is then pushed upwardly on the concave surfaces of the turning arms, as shown in FIGURE 7b. As further movement of side guard heads takes place, the bar is rolled over as shown in FIGURE 7c and rests on the upper surfaces of the striker arms which are then lowered to place the bar on the table rollers 12. In this turning sequence it is to be appreciated that after the striker arms 53 and the turning arm 38 are operatively positioned, a bar may be automatically and simply turned by bringing the guard heads together.

In accordance with the provisions of the patent statutes we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In an apparatus for turning, positioning and guiding workpieces, such as blooms, billets, bars and the like, incident to their being reduced or formed,
   a roller table for supporting the workpieces,
   first and second opposed side guards movable transversely relative to said table, each having a workpiece engaging surface engageable with the workpiece to position it relative to the table and guide the workpiece while moving over the table,
   wherein said workpiece engaging surface of said first side guard constitutes a plane surface arranged perpendicular to a plane normal to the axes of the roller table against which one side of a workpiece engages during the turning thereof, said surface constituted to prevent transversal movement of the workpiece relative to said table, but permitting it to rotate,
   a member carried by said second side guard having a free workpiece engaging end being so constructed and arranged relative thereto that when in an inoperative position it is preceded by said workpiece engaging surface of said second side guards, and in an operative position it precedes said workpiece engaging surface of said second side guard, said member being so formed that said workpiece when engaged thereby is caused to rotate about its longitudinal axis,
   means for positioning said member incident to turning a workpiece in at least said second position, whereby on movement of said second side guard toward a workpiece said member is caused to engage the workpiece and cooperate with said first side guard to turn the workpiece about its longitudinal axis,
   means for moving said side guards relative to each other to effect said turning of the workpiece and thereafter to cause said workpiece engaging surfaces of said side guards to position the turned workpiece in a desired plane and thereafter to guide it during movement in the desired plane,
   said first guard having a second portion arranged to be engaged by said member to cause said member to move towards its inoperative position, and
   wherein the portion of said member is contacted by the workpiece after said engagement takes place so as to cause a turning action to be imparted to the workpiece.

2. In an apparatus for turning, positioning and guiding workpieces, such as blooms, billets, bars and the like, incident to their being reduced or formed, a supporting means for the workpieces, first and second opposed side guards movable transversely relative to said supporting means, each having a workpiece engaging surface engageable with the workpiece to position it relative to the table and guide the workpiece while moving over the table, a member carried by said second side guard having a free workpiece engaging end being so constructed and arranged relative thereto that when in an inoperative position it is preceded by said workpiece engaging surface of said second side guard, and in an operative position it precedes said workpiece engaging surface of said second side guard, means for positioning said member in at least said second position whereby on movement of said second side guard toward a workpiece said member is caused to engage the workpiece and cooperate with said first side guard to turn the workpiece about its longitudinal axis, means for moving said side guards relative to each other to effect said turning of the workpiece and thereafter to cause said workpiece engaging surfaces of said side guards to position the turned workpiece in a desired plane and thereafter to guide it during movement in the desired plane.

a pinch roll carried by each of said side guards in a manner that said pinch rolls are caused to engage opposite sides of a workpiece to cause the pinch rolls to drive the workpiece in said desired plane, and means for driving at least one of said pinch rolls.

3. In an apparatus for turning, positioning and guiding workpieces, such as blooms, billets, bars and the like, incident to their being reduced or formed, a supporting means for the workpieces, first and second opposed side guards movable transversely relative to said supporting means, each having a workpiece engaging surface engageable with the workpiece to position it relative to the table and guide the workpiece while moving over the table, a member carried by said second side guard having a free workpiece engaging end being so constructed and arranged relative thereto that when in an inoperative position it is preceded by said workpiece engaging surface of said side guard, and in an operative position it precedes said workpiece engaging surface of said second side guard, means for positioning said member in at least said second position whereby on movement of said second side guard towards a workpiece said member is caused to engage the workpiece and cooperative with said first side guard to turn the workpiece about its longitudinal axis, means for moving said side guards relative to each other to effect said turning of the workpiece and thereafter to cause said workpiece engaging surfaces of said side guards to position the turned workpiece in a desired plane and thereafter to guide it during movement in the desired plane, a finger carried by said first side guard for vertical movement relative thereto, means for raising the finger to engage a side of a workpiece, the finger and member being so constructed and arranged relative to each other than when said member is in its operative position and said finger is brought into engagement with a workpiece it will cause the workpiece to assume a partially supported position on said member, said member having a workpiece supporting surface sufficient to support one side of a workpiece.

4. In an apparatus according to claim 1 wherein said member is caused to move into its second position by a fluid piston cylinder assembly, means for controlling the pressure in said piston cylinder assembly so as to allow said member to move in a direction of its first position upon movement of either of said side guards toward each other after said member has engaged said second portion of said first side guard.

5. In an apparatus according to claim 1 wherein said first portion of said first side guard includes an arm projecting away from said first side guard, said arm being so arranged that a portion thereof engages one side of a workpiece supported by said table.

6. In an apparatus according to claim 5 wherein said arm is pivotally mounted on said first side guard and has a workpiece carrying surface, means for positioning a portion of said arm and said carrying surface thereof relative to the supporting surface of said table.

7. In an apparatus according to claim 2 wherein said side guards include supports, carriages for each pinch rolls carried by said supports, and means for moving said carriages toward and away from each other relative to its associated side guard.

References Cited by the Examiner

UNITED STATES PATENTS

| | | | |
|---|---|---|---|
| 915,669 | 3/1909 | Fawell. | |
| 1,019,315 | 3/1912 | Geer | 80—48 |
| 3,017,984 | 1/1962 | Willard. | |

FOREIGN PATENTS 46,415  11/1962  Poland.

GERALD M. FORLENZA, *Primary Examiner.*

MARVIN A. CHAMPION, *Examiner.*